(12) United States Patent
Britz

(10) Patent No.: US 7,516,982 B2
(45) Date of Patent: Apr. 14, 2009

(54) GAS BAG MODULE

(75) Inventor: Thomas Britz, Besssenbach (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 269 days.

(21) Appl. No.: 11/445,430

(22) Filed: Jun. 1, 2006

(65) Prior Publication Data

US 2006/0273561 A1 Dec. 7, 2006

(30) Foreign Application Priority Data

Jun. 7, 2005 (DE) .................. 20 2005 008 937 U

(51) Int. Cl.
  *B60R 21/239* (2006.01)
  *B60R 21/276* (2006.01)
(52) U.S. Cl. ...................... 280/739; 280/742; 280/743.1
(58) Field of Classification Search ............. 280/728.2, 280/736, 739, 740, 742, 743.1
  See application file for complete search history.

(56) References Cited

U.S. PATENT DOCUMENTS

| 5,104,727 | A | * | 4/1992 | Wnenchak | .................. | 442/268 |
| 5,330,226 | A | * | 7/1994 | Gentry et al. | ............... | 280/735 |
| 5,957,490 | A | * | 9/1999 | Sinnhuber | .................. | 280/735 |
| 6,376,971 | B1 | | 4/2002 | Pelrine et al. | | |
| 6,517,108 | B1 | | 2/2003 | Vinton et al. | | |
| 6,547,274 | B2 | | 4/2003 | Ochiai | | |
| 6,705,642 | B1 | | 3/2004 | Serban et al. | | |
| 7,264,271 | B2 | * | 9/2007 | Barvosa-Carter et al. | .... | 280/751 |
| 2004/0056459 | A1 | * | 3/2004 | Kassman et al. | ............ | 280/739 |
| 2006/0157962 | A1 | | 7/2006 | Keutz et al. | | |
| 2006/0163856 | A1 | | 7/2006 | Lehmann | | |

FOREIGN PATENT DOCUMENTS

| DE | 202005000924 | 6/2005 |
| DE | 202005001000 | 7/2005 |
| EP | 1279574 | 1/2003 |
| GB | 2329364 | 3/1999 |
| WO | 03097407 | 11/2003 |
| WO | 2004045919 | 6/2004 |

OTHER PUBLICATIONS

U.S. Appl. No. 11/333,984, filed Jan. 18, 2006.

* cited by examiner

*Primary Examiner*—Paul N. Dickson
*Assistant Examiner*—George D. Spisich
(74) *Attorney, Agent, or Firm*—Tarolli, Sundheim, Covell & Tummino LLP

(57) ABSTRACT

A gas bag module for a vehicle occupant restraint device comprises a gas bag and a discharge arrangement in fluid connection with said gas bag. The discharge arrangement has a discharge opening, through which gas can escape from the gas bag, and at least one element made of an electrically activatable polymer actuator to expose and/or alter the discharge opening upon activation of said polymer actuator.

6 Claims, 2 Drawing Sheets

GAS BAG MODULE

TECHNICAL FIELD

The invention relates to a gas bag module for a vehicle occupant restraint device, comprising a gas bag and a discharge arrangement to expose and/or alter a discharge opening through which gas can escape from the gas bag.

BACKGROUND OF THE INVENTION

Such a gas bag module in which a discharge region can be opened in the gas bag wall when a reduction to the internal pressure of the gas bag is required, is known for example from WO-A-2004/045919. A pyrotechnic charge in the form of a fuse is arranged directly on the discharge region such that the discharge region burns through or is torn open mechanically after the fuse has been ignited.

In the gas bag module shown in WO-A-03/097407 a blast pin is provided in order to expose a tubular discharge region of the gas bag.

In EP-A-1 279 574 a gas bag module is shown in which, in order to expose discharge openings, a slider is moved in a holding piece such that bores formed therein are in alignment with the discharge openings. The hot gas flowing into the gas bag melts the region of the gas bag which is situated between the bores of the slider and the discharge openings in the holding piece, such that a portion of the gas emerges from the gas bag during filling.

A gas bag module is known from U.S. Pat. No. 6,547,274 B in which the opening cross-section of a discharge opening in a carrier plate can be exposed by means of piezoelectrically controlled flaps. The current supply of the piezoelectric elements is controlled for example depending on the posture or physique of the vehicle occupant or on the speed of the vehicle.

SUMMARY OF THE INVENTION

The invention provides a gas bag module which makes it possible to control the discharge behaviour safely for the vehicle occupant without increasing the structural space.

According to the invention, a gas bag module for a vehicle occupant restraint device comprises a gas bag and a discharge arrangement in fluid connection with the gas bag. The discharge arrangement includes a discharge opening through which gas can escape from the gas bag, and has at least one element made of an electrically activatable polymer actuator to expose and/or alter the discharge opening upon activation of said polymer actuatuor.

Electro-chemo-mechanical actuators which contain an active layer of polymers which change their volume as a function of an electrical field or electrochemical potential, are designated as polymer actuators. In addition to this active layer, the polymer actuators essentially comprise a passive carrier layer which forms a sandwich-like composite with the active layer, such that when the voltage changes, the composite bends in a similar manner to a bimetal strip with a variation in temperature. A metal layer which is in direct connection with the active layer can serve as the electrode for initiating the electrochemical processes in the active layer leading to the change in volume.

The invention makes use of the fact that the polymer actuators can already be operated at voltage changes of a few volts and can achieve large deflections. It is therefore possible to influence the discharge behaviour of a gas bag module in a specific manner with the polymer actuators. More precisely, the element provided according to the invention with the polymer actuator is used to control the effective cross-section of the discharge opening, i.e. the element provides for the creation of a discharge opening and/or a change to the discharge cross-section. Through the use of such an element, costly and large opening mechanisms can be dispensed with. The discharge arrangement according to the invention has the additional advantage that neither explosive substances or the like, nor a melting of gas bag fabric are necessary to expose a discharge opening, i.e. a separation of particles is ruled out.

Basically, the discharge opening which is controlled by means of the discharge arrangement according to the invention, can be provided on a fixed component of the gas bag module or on the gas bag.

The polymer actuator is preferably integrated into the gas bag wall, in particular woven into the fabric of the gas bag wall or connected with the gas bag fabric by being sewn or glued on. Particularly preferably, the electrochemically inert fabric material may serve as the carrier layer for the active layer of the polymer actuator. When a voltage is applied to the polymer actuator, a deformation of the gas bag fabric is then brought about, whereby a discharge region in the gas bag wall can be produced, enlarged or reduced.

In particular, a predetermined breaking point can be provided in the discharge opening, for example through the existence of tear edges or by a change to the structure or thickness of the gas bag fabric on which the polymer actuator acts.

Alternatively, the polymer actuator can also be part of a covering which is arranged over a discharge opening formed in the gas bag wall.

With an arrangement of the polymer actuator on a pivotable flap, a hinge mechanism can be produced for controlling the flap.

Finally, the polymer actuator can act together with a silicone membrane, which is integrated in either the gas bag fabric or the covering, and which bursts through activation of the polymer actuator and exposes the discharge opening.

Advantageous developments of the invention are indicated in the sub-claims.

Further features and advantages of the invention will be apparent from the following description of preferred embodiments of the invention.

DETAILED DESCRIPTION OF PREFERRED EMBODIMENTS

Figure 1:
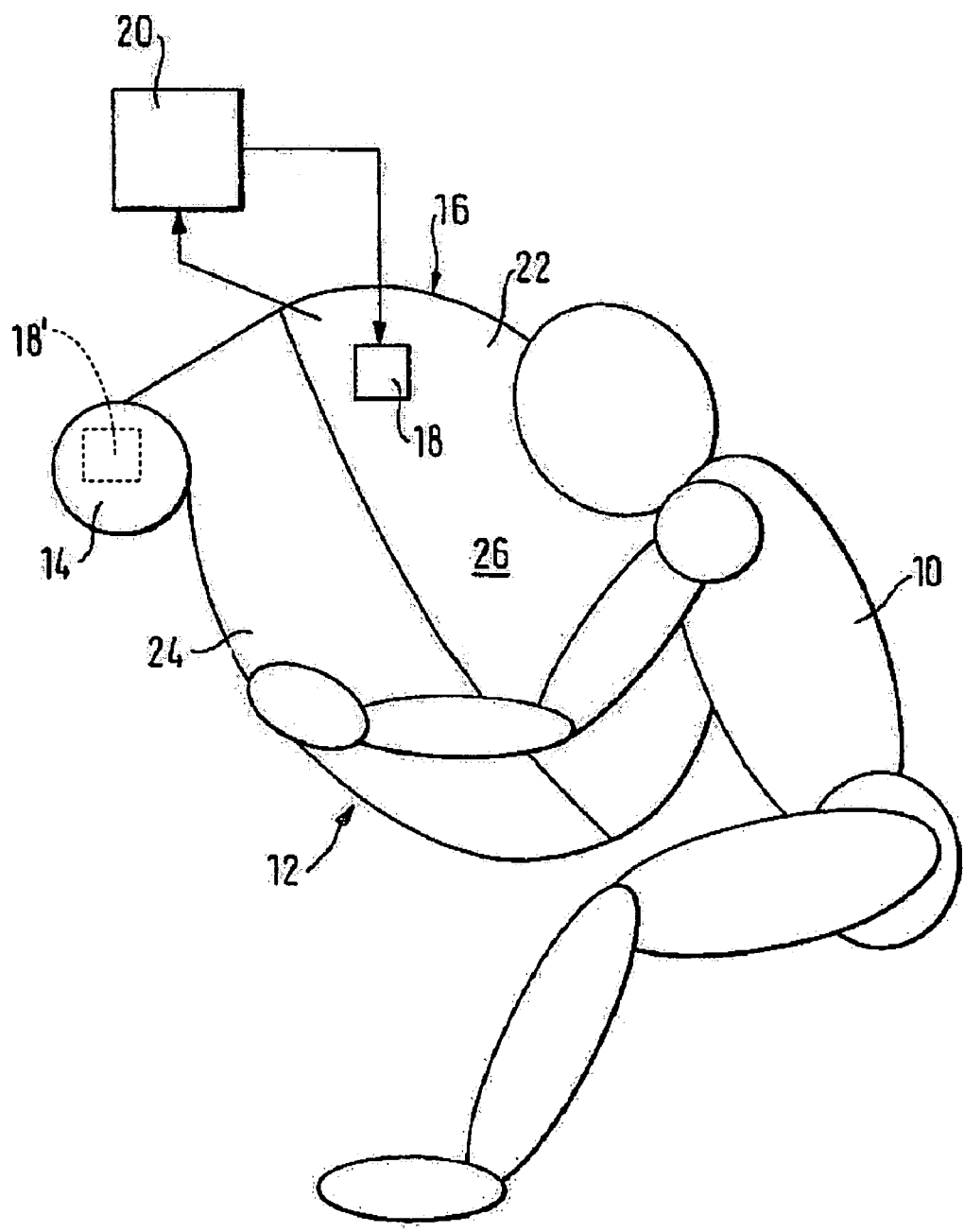
FIG. 1 shows a diagrammatic illustration of the gas bag module according to the invention in a case of load.

In FIG. 1 a vehicle occupant 10 is illustrated, plunging into an inflated gas bag 12 of a vehicle occupant restraint system. The gas bag 12, which has unfolded out of the housing of a gas bag module 14, has a gas bag wall 16 on which an electrically controllable discharge arrangement 18 is arranged. The discharge arrangement 18 serves to selectively provide a discharge opening through which gas can escape from the gas bag 12, i.e. the discharge arrangement 18 provides for a discharge opening and/or a change in the discharge cross-section to be produced. The discharge arrangement 18 comprises a polymer actuator (not illustrated) which is connected directly or indirectly with an electronic control arrangement 20, i.e. the polymer actuator is able to be activated by the electronic control arrangement 20.

The polymer actuator preferably comprises a passive carrier layer and also an active layer of a polymer which changes its volume upon application of an electrical field or electrochemical potential, usually in the voltage range of −3V to +3V. A metal layer which can be vapour deposited onto the active layer or the carrier layer serves for contacting or as an electrode. Through the volume change in the active layer as a result of voltage variation, the sandwich-like composite of the active layer and the passive carrier layer bends in a similar manner to a bimetal strip with a variation in temperature. The polymer of the active layer may be selected in particular from the group of piezoelectric polymers, electrostrictive polymers, polymer gels, carbon nano-capillaries, conductive conjugate polymers and ion-conducting polymers. Ion-conducting polymers or polymer gels which serve as a solid electrolyte at the same time and can therefore be used under ambient conditions without further structural measures, are preferred.

In a particularly preferred embodiment, a portion of the gas bag wall in the region of the discharge arrangement 18 serves as a passive carrier layer of the polymer actuator, i.e. the polymer actuator is integrated into the gas bag wall or the gas bag fabric. In this case, a particularly compact type of construction of the discharge arrangement is possible.

In the case of load, when a discharge of gas from the gas bag 12 of the vehicle occupant restraint system is desired, the polymer actuator of the discharge arrangement 18 can be deformed mechanically by the application of an electric voltage. This mechanical deformation of the polymer actuator causes the gas bag fabric to tear in the region of the discharge arrangement 18 and therefore causes a discharge opening to be exposed. The electrical signal which is applied to the polymer actuator may be a pure control signal here, which only brings about the exposure of the discharge opening for example after a particular period of time has elapsed since the gas bag module was activated. However, it may also be a regulating signal, when the discharge opening is only to be exposed in particular cases of load. The electronic control arrangement 20 can therefore also evaluate the data of particular sensors which measure for example the internal pressure in the airbag or determine the weight of the vehicle occupant, and then decide, as a function of the respective case of load, whether the discharge opening is exposed.

Figure 2:
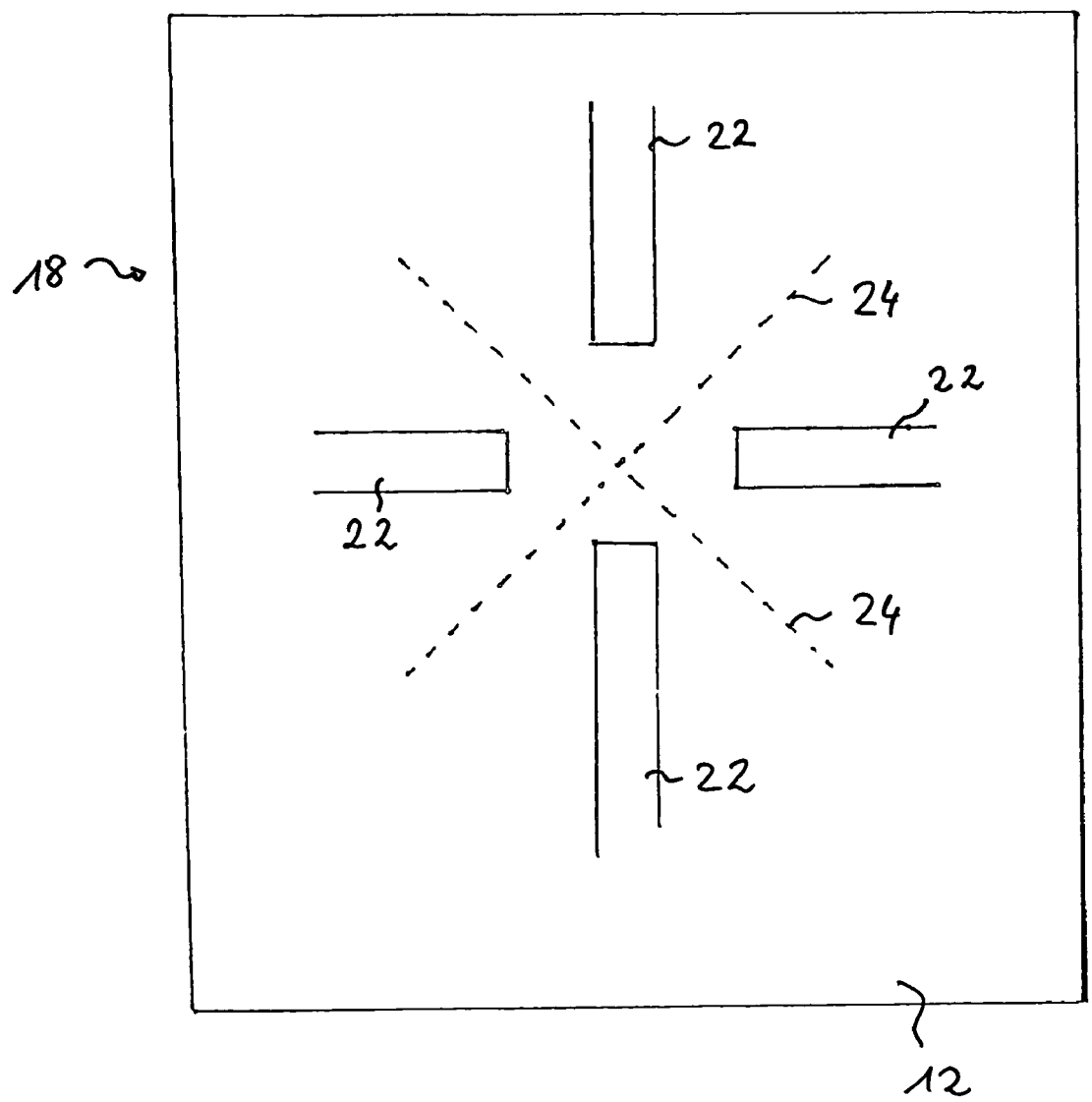
FIG. 2 shows an embodiment of the discharge arrangement.

In FIG. 2 a preferred embodiment of the discharge arrangement 18 is shown, which can be opened by means of polymer actuators 22. The fabric of the gas bag 12 is already previously impaired by two intersecting tear edges 24 perpendicular to each other, acting as a predetermined breaking point, in order to facilitate the formation of the discharge opening. In each of the four sectors formed by the tear edges 24, a polymer actuator 22 is situated respectively on the outer side of the gas bag fabric, the passive layer of the polymer actuator 22 being connected with the gas bag fabric, for example glued on, and the active layer of the polymer actuator 22 lying over it. When the gas bag is activated, the polymer actuators 22 may, if required, also be activated by means of the electronic control arrangement (not shown). In so doing, the active layer reduces its volume and the polymer actuator 22 exerts a force onto the fabric of the gas bag 12 which leads to the fabric tearing open at the sites which have been previously impaired. The fabric then flaps outwards, with the increased internal pressure in the gas bag assisting the formation of the discharge opening. Instead of the gas bag fabric, a silicone membrane can be present in the area of the discharge arrangement 18, which is connected to the polymer actuator 22 and which tears open through an activation of the polymer actuator.

In addition, the polymer actuator may be arranged on a pivotable flap associated with the discharge opening, the flap being able to be formed on the gas bag. Alternatively, the actuator may be arranged on a flap formed on the housing of the gas bag module 14, illustrated schematically at 18' in FIG. 1.

Finally, by means of the polymer actuators according to the present invention, it is possible to open, close or only change the discharge cross-section of a discharge opening already present for example in the housing 14 of the gas bag module, depending on the respective case of load.

The invention claimed is:

1. A gas bag module for a vehicle occupant restraint device comprising a gas bag (12) and a discharge arrangement (18) in fluid connection with the gas bag,
   the discharge arrangement (18) including a discharge opening through which gas can escape from the gas bag (12),
   the discharge arrangement (18) having at least one element made of an electrically activatable polymer actuator (22), to expose and/or alter the discharge opening,
   the polymer actuator (22) being integrated into a wall part with the discharge opening,
   the polymer actuator (22) comprising a carrier layer and an active layer made of a polymer, and
   the polymer changing its volume with a variation in voltage and being selected from the group of electrostrictive polymers, polymer gels, carbon nano-capillaries, conductive conjugate polymers and ion-conducting polymers.

2. The gas bag module according to claim 1, characterized in that the polymer actuator is part of a covering which is arranged over the discharge opening formed in the wall part.

3. The gas bag module according to claim 1, characterized in that the discharge opening comprises a predetermined breaking point (24) on which the polymer actuator (22) acts.

4. The gas bag module according to claim 1, characterized in that the discharge opening is provided on a fixed component of the gas bag module.

5. The gas bag module according to claim 1, wherein the discharge opening includes a silicone membrane, and the polymer actuator acts together with the silicone membrane by tearing open said silicone membrane when the polymer actuator is activated.

6. The gas bag module according to claim 1, characterized in that the carrier layer is part of a wall part of the gas bag (12) in the region of the discharge arrangement (18).

* * * * *